J. Q. BLACK.
CHEESE-PRESERVER.
No. 170,222. Patented Nov. 23, 1875.
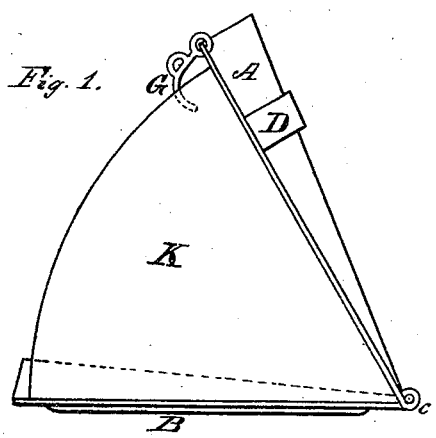
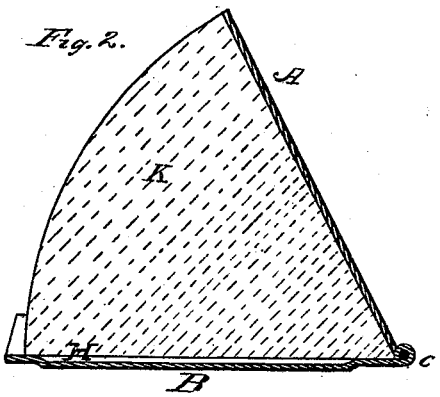
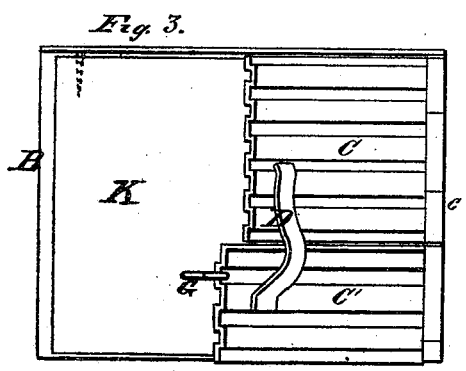
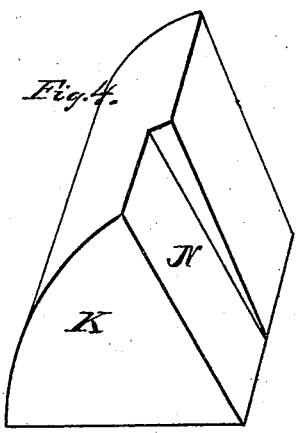
WITNESSES
INVENTOR
John Q. Black,
Chapman Fosmer & Co,
ATTORNEYS

UNITED STATES PATENT OFFICE.

JOHN Q. BLACK, OF SEXTONVILLE, WISCONSIN.

IMPROVEMENT IN CHEESE-PRESERVERS.

Specification forming part of Letters Patent No. 170,222, dated November 23, 1875; application filed September 30, 1875.

*To all whom it may concern:*

Be it known that I, JOHN Q. BLACK, of Sextonville, in the county of Richland and State of Wisconsin, have invented a new and valuable Improvement in Cheese-Preservers; and I do hereby declare that the following is a full, clear, and exact description of the construction and operation of the same, reference being had to the annexed drawings making a part of this specification, and to the letters and figures of reference marked thereon.

Figure 1 of the drawings is a representation of a bottom view of my cheese-preserver. Fig. 2 is a sectional view thereof, and Fig. 3 is a plan view. Fig. 4 is a perspective view of the cheese.

My invention relates to means for preserving cheese from insects, &c., while it is being retailed or otherwise gradually lessened in bulk; and it consists in the novel construction of two angle-pieces, as hereinafter described, one of which is corrugated, sectional, and provided with a hook and spring, and the other is formed with an interior recess, as specified and shown.

A B of the drawings represent the two sides of my preserver, hinged together at $c$. Of these two sections, A is corrugated, as shown on Fig. 3, and is also divided into an upper and lower section, as shown on said figure, and marked respectively C C'. These subdivisions of section A are united by the spring D, and the part C' has also a hook, G, as represented. The section B of my device is constructed in the usual manner, except that I form in it a recess, H, for the purpose hereinafter mentioned. The letter K of the drawings represents a portion of a cheese to which my preserver may readily be applied. The small recess shown at N may be readily closed by means of the section C', and all access thereto by flies or similar insects be prevented. This is accomplished by drawing said section or wing into said recess, and securing it in position by forcing the point of the hook G into the cheese. The spring D serves to keep the section C closed to the cheese whenever the part C' is pressed into a recess formed in the cheese.

The corrugations upon the part A and the recess upon the part B serve to admit air to the cheese, and thereby prevent moulding.

What I claim as new, and desire to secure by Letters Patent, is—

1. In a cheese-preserver, the corrugated section A, subdivided into parts or wings C C', and provided with hook G and spring D, substantially as specified.

2. In a cheese-preserver, the section B, constructed with a recess, H, substantially as and for the purpose specified.

In testimony that I claim the above, I have hereunto subscribed my name in the presence of two witnesses.

JOHN Q. BLACK.

Witnesses:
H. H. BARNARD,
E. E. BARNARD.